United States Patent
Schmatloch

(10) Patent No.: US 10,533,119 B2
(45) Date of Patent: Jan. 14, 2020

(54) RAPID DRIVE AWAY TIME ADHESIVE FOR INSTALLING VEHICLE WINDOWS

(71) Applicant: Dow Global Technologies LLC, Midland, MI (US)

(72) Inventor: Stefan Schmatloch, Thalwil (CH)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 0 days.

(21) Appl. No.: 14/781,414

(22) PCT Filed: Apr. 21, 2014

(86) PCT No.: PCT/US2014/034774
§ 371 (c)(1),
(2) Date: Sep. 30, 2015

(87) PCT Pub. No.: WO2014/179091
PCT Pub. Date: Nov. 6, 2014

(65) Prior Publication Data
US 2016/0046848 A1    Feb. 18, 2016

Related U.S. Application Data

(60) Provisional application No. 61/818,505, filed on May 2, 2013.

(51) Int. Cl.
| | |
|---|---|
| *C08K 3/013* | (2018.01) |
| *C08K 5/00* | (2006.01) |
| *C08K 5/5435* | (2006.01) |
| *C08G 18/10* | (2006.01) |
| *C08G 18/12* | (2006.01) |
| *C08G 18/42* | (2006.01) |
| *C08G 18/48* | (2006.01) |
| *C09J 175/04* | (2006.01) |
| *C09J 175/08* | (2006.01) |

(52) U.S. Cl.
CPC ............ *C09J 175/08* (2013.01); *C08G 18/10* (2013.01); *C08G 18/12* (2013.01); *C08G 18/42* (2013.01); *C08G 18/48* (2013.01); *C09J 175/04* (2013.01); *C08K 3/013* (2018.01); *C08K 5/0016* (2013.01); *C08K 5/5435* (2013.01)

(58) Field of Classification Search
CPC ..... C09J 175/04; C09J 175/08; C08K 5/0016; C08K 3/0033; C08K 5/5435; C08K 3/013; C08G 18/10; C08G 18/12; C08G 18/42; C08G 18/48
See application file for complete search history.

(56) References Cited

U.S. PATENT DOCUMENTS

| | | | |
|---|---|---|---|
| 4,780,520 A | 10/1988 | Rizk et al. | |
| 5,124,372 A * | 6/1992 | Katona | C08K 9/04 523/200 |
| 5,922,809 A | 7/1999 | Bhat et al. | |
| 5,976,305 A | 11/1999 | Bhat et al. | |
| 6,015,475 A | 1/2000 | Hsieh et al. | |
| 6,512,033 B1 | 1/2003 | Wu | |
| 6,657,035 B1 | 12/2003 | Nakata et al. | |
| 6,709,539 B2 | 3/2004 | Zhou | |
| 7,101,950 B2 | 9/2006 | Zhou et al. | |
| 7,226,523 B2 | 6/2007 | Rosenberg et al. | |
| 7,361,292 B2 | 4/2008 | Nakata et al. | |
| 8,227,857 B2 | 7/2012 | Goarin | |
| 8,236,891 B2 | 8/2012 | Golombowski et al. | |
| 2002/0100550 A1 * | 8/2002 | Mahdi | C03C 27/048 156/329 |
| 2010/0154969 A1 * | 6/2010 | Golombowski | C09J 175/08 156/71 |

FOREIGN PATENT DOCUMENTS

| | | |
|---|---|---|
| CA | 2564992 | 11/2005 |
| WO | 2011137047 A1 | 11/2011 |

* cited by examiner

*Primary Examiner* — Patrick D Niland
(74) *Attorney, Agent, or Firm* — Tong Li

(57) ABSTRACT

The adhesive compositions of the invention are especially useful in bonding replacement windows into structures without using a primer and allowing for fast drive away times. The adhesive is pumpable, sag resistant and bonds parts together at temperatures between about −10 C and about 80 C. The adhesive is comprised a linear and branched isocyanate functional polyether prepolymer wherein the linear and branched isocyanate functional polyether prepolymers are present in the composition at a particular weight ratios an isocyanate functional polyester prepolymer, a plasticizer and filler.

16 Claims, No Drawings

RAPID DRIVE AWAY TIME ADHESIVE FOR INSTALLING VEHICLE WINDOWS

FIELD OF INVENTION

The invention relates to an adhesive composition comprising isocyanate functional prepolymers and silanated compounds that are useful in bonding glass into vehicles and buildings and methods of using them.

BACKGROUND OF INVENTION

Adhesive compositions have been used to bond windows into buildings and vehicles. Examples of adhesives useful for these applications are described in Rizk, U.S. Pat. No. 4,780,520; Bhat, U.S. Pat. No. 5,976,305; Bhat, U.S. Pat. No. 5,922,809; Hsieh et al, U.S. Pat. No. 6,015,475; Zhou, U.S. Pat. No. 6,709,539; Rosenberg et. al., U.S. Pat. No. 7,226,523; Wu, U.S. Pat. No. 6,512,033; Zhou, U.S. Pat. No. 7,101,950; Zhou, U.S. Pat. No. 7,361,292; Nakata, et al., U.S. Pat. No. 6,657,035, Golombowski et al., U.S. Pat. No. 8,236,891 and Bosshard et al., CA 2,564,992. In automobile factories windows are installed using robots and computer controlled processing which facilitates the use of a variety of high performance adhesives, for instance, nonconductive adhesives and high modulus adhesives. The speed of cure is not a significant issue because new vehicles are not driven any significant distance for several days after window installation.

In contrast, when a vehicle needs a window replaced, it is often driven shortly after. The replacement is often performed in a remote location by an installer working from a vehicle or otherwise under uncontrolled conditions. Consequently, speed of cure is important as the vehicle owner desires to drive the vehicle as soon as possible after installation of the window. Adhesives useful in replacing windows for vehicles which facilitate fast drive away times are also known; see Bhat, U.S. Pat. No. 5,976,305; Zhou, U.S. Pat. No. 6,709,539 and Rosenberg et al., U.S. Pat. No. 7,226,523. These adhesives typically are polyurethane based with isocyanate functional prepolymers that require primers to enable the adhesion of the adhesive to the window and also give UV protection to the adhesive. The primers generally require further isocyanate compounds to facilitate the bonding of the adhesive to the glass. These primers are typically referred to as black primers because of the necessity to absorb UV light. These adhesives could have further improved performance to allow for faster drive away times and performance in the application. Generally, the performance of the adhesive in the application correlates with the impact resistance in Joules (J) with respect to time and shear (G) modulus (a measure of stiffness).

Consequently, it would be desirable to have a rapid drive away adhesive for bonding glass into a structure that has the required characteristics (such as high modulus and nonconductive nature), exhibits fast safe drive away times (fast impact strength development) when applied under a wide range of environmental conditions, does not require expensive ingredients, has acceptable sag and string when applied and long shelf life, while also not requiring a primer or other pretreatment containing isocyanates.

SUMMARY OF INVENTION

A first aspect of the invention is an adhesive composition comprising:
a) a reactive silicon adhesion promoter;
b) a linear isocyanate functional polyether prepolymer having an average polydispersity index of at most about 2.5 determined by GPC at a Mp of >1,000;
c) a branched isocyanate functional polyether prepolymer having an average polydispersity of at most about 2.5 determined by GPC at a Mp of >1000 wherein the linear and branched isocyanate functional polyether prepolymers are present in the composition at a weight ratio of 1/3 to 5/1;
d) an isocyanate functional polyester prepolymer which is solid at 23° C.;
e) a plasticizer;
f) a filler comprised of a carbon black in an amount from 10% to about 17% and at least one other filler, in which the total amount of filler is from about 27% to 50% by weight of the composition; and
g) a catalyst for the reaction of isocyanate moieties with isocyanate reactive groups.

It has been discovered that the adhesive composition of the first aspect allows for rapid drive away times under various uncontrolled environmental conditions. In particular the adhesive composition allows for primerless bonding of replacement windshields having a combination of high impact energy within 15 minutes of application while also achieving a high stiffness (shear "G" modulus) after 7 days while not sacrificing the overall stiffness of the vehicle, thus allowing for the maintence of NVH (noise, vibration and harshness) and suspension parameters of the originally manufactured vehicle.

In another aspect the invention is a method of bonding two or more substrates together comprising,
(a) disposing the adhesive of the first aspect on at least a portion of a surface of at least one of the substrates, wherein the substrates are not treated with a primer,
(b) contacting the adhesive composition disposed on the surface of said substrate with another substrate such that the adhesive composition is disposed between the substrates, and
(c) curing the adhesive under ambient conditions, wherein the adhesive has a shear modulus of at least 2.3 MPa after 7 days, and an impact energy of at least 2.5 Joules after 15 minutes. In a preferred embodiment, the adhesive also has a lap shear strength of at least 3 MPa after fully curing.

The adhesive composition of the invention may be used to bond a variety of substrates together. Examples of substrates include plastic, glass, wood, ceramics, metal, and coated substrates, such as plastics coated with an abrasion resistant coating. The adhesive compositions of the invention may be used to bond similar and dissimilar substrates together. The adhesives are especially useful for bonding glass or a plastic with an abrasion resistant coating disposed thereon to other substrates such as vehicles (e.g., automobiles) and buildings. The compositions of the invention are also useful in bonding parts of modular components together, such as vehicle modular components. The glass or plastic coated with an abrasion resistant coating may be bonded to coated and uncoated portions of vehicles.

The compositions of the invention are especially useful in bonding replacement windows into structures. The adhesive is pumpable, sag resistant and bonds parts together at temperatures between about −10° C. and about 80° C. Preferably, the composition has a sag of an uncured sample of less than about 2 mm. This allows the adhesives prepared from the composition of the invention to be applied at a wide range of ambient temperatures. Heating the material is not necessary for the application of the adhesive. Furthermore, the adhesive demonstrates a combination of high early impact resistance and rapid strength development which facilitates rapid drive away times of preferably 30 minutes, and more preferably 15 minutes, after application of the adhesive at temperatures described above.

In particular, windshields installed under such conditions meet United States Federal Motor Vehicle Safety Standard (FMVSS) 212. The adhesives desirably are nonconductive and demonstrate a resistivity of at least $10^{10}$ Ohm-cm. The compositions of the invention generally demonstrate a maximum load after 15 minutes of about 2.3 Joules (J) or greater, more preferably about 2.4 J or greater and most preferably about 2.5 J or greater at 23° C. under ambient conditions (typical relative humidities on the order of 25% to 75%) in the high speed impact test described below. In addition to the impact resistance, the stiffness of the adhesives after being fully cured is sufficient to enable the windshield to be more effective as a structural stiffening member. Generally, the shear modulus (G modulus) is at least 2.5 MPa and may be 2.7 MPa or even 2.9 MPa after curing for seven days under the conditions described above.

The adhesive may be hand gun applied. The applicability of the adhesive is generally correlated with the press flow viscosity test described herein. The composition generally has a press flow viscosity of about 8 grams or greater, more preferably, about 10 grams or greater and most preferably, about 12 grams or greater for 1 minute.

DETAILED DESCRIPTION OF INVENTION

"Nominal" as used with respect to functionality means the theoretical functionality, generally this can be calculated from the stoichiometry of the ingredients used. Generally, the actual functionality is different due to imperfections in raw material, incomplete conversion of the reactants and formation of bi-products. "Polydispersity" is expressed as the polydispersity index PDI and means the weight average molecular weight, Mw, divided by the number average molecular weight, Mn.

The silicon adhesion promoter is present in an amount sufficient to allow the adhesive composition to achieve sufficient binding strength (e.g., lap shear strength) in the absence of a primer or other pre-treatment of the substrate. The silicon adhesion promoter may be any that can undergo hydrolysis such as described at column 4, lines 25 to 55 of U.S. Pat. No. 6,613,816. Other illustrative reactive silicons may be found in U.S. Patent Publication 2002/0100550 paragraphs 0055 to 0065 and Hsieh, U.S. Pat. No. 6,015,475, column 5, line 27 to column 6, line 41. A preferred silicon adhesion promoter is one that contains hydrolysable silane groups and epoxy groups. Examples of silicon adhesion promoters having epoxy and hydrolysable silane groups include beta-(3,4-epoxycyclohexyl)ethyltrimethoxysilane and gamma-glycidoxypropyltrimethoxysilane, which are available under the tradename SILQUEST A186 and A187 (Momentive Performance Materials Inc., Albany, N.Y.).

The silicon that is reactive (e.g., hydrolysable silane) present in the adhesive composition is, generally about 0.001% to 1% by weight of the total weight of the adhesive composition. The amount of the reactive silicon (note, the weight of the silicon itself and does not include, for example, the organic groups appended thereto), may be at least 0.005%, 0.01%, 0.02%, 0.04%, 0.06%, 0.08% or 0.1% to at most 0.8%, or 0.5% of the adhesive composition.

The adhesive composition is comprised of two isocyanate functional polyether based prepolymers, one that is linear and one that is branched. The total amount of these prepolymers is an amount sufficient to provide the adhesive characteristics desired. Such prepolymers have an average isocyanate functionality sufficient to allow the preparation of a crosslinked polyurethane upon cure and not so high that the polymers are unstable. "Stability" in this context means that the prepolymer or adhesive prepared from the prepolymer has a shelf life of at least 6 months at ambient temperatures, in that it does not demonstrate an increase in viscosity during such period which prevents its application or use. Preferably, the prepolymer or adhesive prepared therefrom does not undergo an increase in viscosity of more than about 50 percent during the stated period.

Generally both of these types of prepolymer are prepared by reacting one or more polyisocyanates with one or more compounds containing on average more than one isocyanate reactive group per molecule. The prepolymer preferably has a free isocyanate content which facilitates acceptable strength in adhesives prepared from the prepolymers after 60 minutes and stability of the prepolymer. Preferably, the free isocyanate content is about 1.2 percent by weight or greater based on the weight of the prepolymer and more preferably about 1.4 percent by weight or greater, and most preferably about 1.6 percent by weight or greater, and preferably about 2.2 percent by weight or less, more preferably about 2.0 or less, even more preferably about 1.8 percent by weight or less. Above about 2.2 percent by weight, the adhesives prepared from the prepolymer may demonstrate lap shear strengths after 60 minutes which are too low for the intended use. Below about 1.2 percent by weight, the prepolymer viscosity is too high to handle and the working time is too short. As is well known to the expert in the art, the polydispersity by definition is 1.0 or greater. The prepolymers preferably exhibit a polydispersity of about 2.5 or less, more preferably about 2.3 or less and most preferably about 2.1 or less.

Preferably, the viscosity of the prepolymer is about 200 Pa s or less, and more preferably about 150 Pa s or less, and most preferably about 120 Pa s or less. Preferably, the viscosity of the prepolymer is about 50 Pa s or greater. The viscosity of the adhesive can be adjusted with fillers, although the fillers generally do not improve the green strength of the final adhesive. Below about 50 Pa s the adhesive prepared from the prepolymer may exhibit poor high speed tensile strength. Above about 150 Pa s the prepolymer may be unstable and hard to pump. "Viscosity" as used herein is measured by the Brookfield Viscometer, Model DV-E with a RV spindle #5 at a speed of 5 revolutions per second and at a temperature of 23° C.

Preferably, the polyisocyanates for use in preparing the polyether prepolymers include any aliphatic, cycloaliphatic, araliphatic, heterocyclic or aromatic polyisocyanate, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and most preferably no greater than about 3.0. Higher functionality may also be used, but may cause excessive cross-linking, and result in an adhesive which is too viscous to handle and apply easily, and can cause the cured adhesive to be too brittle. Preferably, the equivalent weight of the polyisocyanate is at least about 80, more preferably at least about 110, and is most preferably at least about 120; and is preferably no greater than about 300, more preferably no greater than about 250, and most preferably no greater than about 200.

Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanato-cylohexyl) methane, and trimethyl hexamethylene diisocyanate. The most preferred isocyanate is diphenylmethane diisocyanate.

The term "isocyanate-reactive compound" as used herein includes any organic compound having nominally at least two isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. More preferably, the isocyanate reactive compound is a polyol, and is even more preferably a polyether polyol.

Preferably, polyols useful in the preparation of the polyether prepolymers include those disclosed in Wu, U.S. Pat. No. 6,512,033 at column 4, line 10 to line 64, incorporated herein by reference, and include, for example, polyether polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each alkylene oxides. In one preferred embodiment, the polyol comprises propylene oxide chains with ethylene oxide chains capping the polyol. In a preferred embodiment, the polyols are a mixture of diols and triols. Preferably, the isocyanate-reactive compound has a functionality of at least about 1.8, more preferably at least about 1.9, and is most preferably at least about 1.95; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

The amount of isocyanate containing compound used to prepare the prepolymer is that amount that gives the desired properties, that is, the appropriate free isocyanate content and viscosities as discussed hereinbefore. Preferably, the isocyanates are used to prepare in the prepolymer in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the prepolymer are used in an amount of about 2.0 equivalents of isocyanate or less, more preferably 1.8 equivalents of isocyanate or less and most preferably about 1.6 equivalents of isocyanate or less.

To reiterate, the adhesive composition contains two polyether prepolymers, one that is linear and one that is branched. In making the linear polyether prepolymer, the polyisocyanate and polyol have a functionality that is nominally 2. When making the branched polyether prepolymer, the average functionality either the polyisocyanate, polyol, or both is greater than two. Typically, the functionality of the polyol is 3 or greater. The amount of linear and branched prepolymer may be determined by calculating the starting components or by measuring the NCO content, the molecular weight distribution and functional end group via $^1$H-NMR spectroscopy.

The polyether prepolymers may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. "Isocyanate content" means the weight percentage of isocyanate moieties to the total weight of the prepolymer. The reactions to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate. Preferably, the reaction is carried out in admixture with a plasticizer. The following procedures are used to prepare a prepolymer having the desired polydispersity. Preferably a polyether diol, having an effective functionality of at least 1.9, preferably at least 1.95 and a polyether triol, having an effective functionality of at least 2.8, preferably at least 2.9 are reacted with an aromatic polyisocyanate with a functionality of at least 2.0. The polyether polyols may contain up to 30 percent of ethylene oxide units. Preferred polyether diols have a molecular weight of about 1,000 to about 6,000 and preferred polyether triols have a molecular weight of about 3,000 to about 9,000 as calculated from the OH-number. Other less preferred isocyanate functional prepolymers, having PDIs in excess of 2.5 may be added in such an amount that the average polydispersity index PDI (Mw/Mn) of the prepolymer mixture is 2.5 or less. It is possible to calculate the PDI of polymer mixtures from the Mn and Mw data of the individual component (pre)polymers as is well known to the expert in the art. The following formula gives the relationship:

$$PDI_{(prepolymer\ mixture)} = \frac{\sum w_i * Mw_i}{\sum x_i * Mn_i}$$

Xi=mole fraction, wi=weight fraction of all prepolymers in an adhesive mixture.

The total amount of polyether prepolymers are present in the composition of the invention in a sufficient amount such that the adhesive is capable of realizing the desired adhesive characteristics. Preferably, the total amount of polyether prepolymer is present in an amount of about 10 percent by weight or greater based on the weight of the composition, more preferably about 30 percent by weight or greater and most preferably about 50 percent by weight or greater. Preferably, the polyurethane prepolymer is present in an amount of about 65 percent by weight or less based on the weight of the composition, more preferably about 60 percent by weight or less and most preferably about 55 percent by weight or less.

The ratio of the amount of linear polyether prepolymer and branched polyether prepolymer in the adhesive composition is from 1/3 to 5/1 by weight. Desirably the ratio of linear polyether prepolymer/branched prepolymer ($P_l/P_b$) is from 10/13 to 3/1 or even from 3/2 to 3/1. Generally, if the ratio is too high, then it is difficult to achieve the necessary shear modulus of the cured adhesive and if the ratio is too low, it is difficult to achieve the desired impact resistance. The adhesive composition is comprised of an isocyanate functional polyester prepolymers. The polyester prepolymer contains one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less.

The polyester prepolymer can be prepared using one or more polyester polyols and preferably an aromatic polyisocyanate. In order to facilitate pumpability, it may be diluted with a plasticizer. The amount of polyester polyol in the prepolymer is a sufficient amount to support pumpability of the composition of the invention. Preferably, the polyester polyol is present in the polyester polyol based isocyanate prepolymer in an amount of about 70 percent by weight or greater based on the weight of the prepolymer and more preferably about 80 percent by weight or greater. Preferably, the polyester polyol is present in the polyester polyol based isocyanate prepolymer in an amount of about 95 percent by weight or less based on the weight of the prepolymer and more preferably about 90 percent by weight or less.

The polyester prepolymer is present in the adhesive composition in sufficient amount to support the needed green strength and the desired rheology of the composition, particularly on initial application of the adhesive composition to a substrate. If the amount is too high, the adhesive composition is not hand gun applicable at ambient temperature. The polyester polyol based isocyanate prepolymer is generally present in the adhesive composition in an amount of about 0.1 percent by weight or greater based on the weight of the adhesive composition, more preferably about 0.2 percent by weight or greater and most preferably about 0.4 percent by weight or greater. Generally, the polyester polyol based isocyanate prepolymer is present in the adhesive composition in an amount of about 5 percent by weight or less, even more preferably about 3 percent by weight or less and most preferably about 2 percent by weight or less. The polyester polyol can be any polyester composition that meets the property requirements defined, which is crystalline at ambient temperatures and melts in the desired temperature range. Preferred polyester polyols are prepared from linear diacids and linear diols. A more preferred diacid is adipic acid. More preferred diols are the $C_{2-6}$ diols, with butane diols, pentane diols and hexane diols being most preferred. The polyester based polyisocyanate prepolymers can be prepared using the processes and isocyanates described hereinbefore. Preferred polyester polyols are available from Creanova under the trade name DYNACOL and the designations 7381, 7360 and 7330, with 7381, most preferred.

The adhesive composition is comprised of a plasticizer. The plasticizers useful in the adhesive are common plasticizers useful in polyurethane adhesive applications and well known to those skilled in the art and are referred hereinafter as low polar plasticizers. The plasticizers can be added to the adhesive either during preparation of the prepolymers or during compounding of the adhesive composition. The plasticizers are present in an amount sufficient to disperse the prepolymer in the final adhesive composition. The plasticizers are generally present in the adhesive composition in an amount from about 5% to 25% percent by weight of the adhesive composition. Typically the amount of plasticizer is at least about 8% or 10% to at most about 20% or 15% by weight of the adhesive composition.

The adhesive composition is comprised of a filler. The filler is comprised of a carbon black in an amount from 10% to about 17% and at least one other filler, in which the total amount of filler is from about 27% to 50% by weight of the adhesive composition. Preferably, the amount of carbon black is less than 15% by weight of the adhesive composition. "Standard carbon black" is carbon black which is not specifically surface treated or oxidized to render it nonconductive. One or more nonconductive carbon blacks may be used in conjunction with the standard carbon black, although such inclusion may add unnecessary costs. The amount of standard carbon black in the composition is that amount which provides the desired color, viscosity, sag resistance and strength while having the adhesive remain non-conductive Carbon blacks useful in the composition include, for example, RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™30 carbon black available from Degussa. Nonconductive carbon blacks are well known in the art and include RAVEN™ 1040 and RAVEN™ 1060 carbon black available from Colombian.

It has now been discovered that an adhesive with the sag performance, nonconductivity and other properties may be achieved when using a hydrophilic filler in combination with carbon black. A suitable hydrophilic filler is clay. Typically, the clay has a specific surface area of at least 5 m²/g. Clays useful in the invention include kaolin, surface treated kaolin, calcined kaolin, aluminum silicates and surface treated anhydrous aluminum silicates. The clays can be used in any form which facilitates formation of the adhesive composition with the desired properties. Preferably, the clay is admixed in the form of pulverized powder, spray-dried beads or finely ground particles. It is also desirable for the clay to be calcined (heat treated to remove or reduce the hydrated water of the clay). An example of a suitable clay is Polestar 200R (IMERYS) (55% SiO2, 45% Al2O3) with an average particle size of about 2 micrometers, and a BET surface of 8.5 m²/g.

In a preferred embodiment, it has been discovered that it is advantageous to have an additional hydrophobic filler in combination with the hydrophilic filler. Hydrophobic fillers are fillers that have been hydrophobically modified. Modifications include coatings with organosilanes or fatty acids. Hydrophobic filler used herein is generally precipitated calcium carbonate with spherical morphology, coated with fatty acids. The coating level is approx. 1 to 5%. It has been discovered that the hydrophobic filler when present in a sufficient amount, improves the shear modulus obtained without loss in the impact resistance. Generally, the hydrophobic filler is present in an amount that is from greater than 0% to 50% by weight of the total amount of hydrophilic filler and hydrophobic filler (not including carbon black). Preferably the amount is from 5%, 10% or 15% to 40% or 35%.

An example of a suitable hydrophobic filler is calcium carbonate that has been treated to render it hydrophobic, which is well known in the art. Hydrophobic calcium carbonates illustratively are typically treated/coated with organic acids or esters of organic acids to render them hydrophobic. Examples of suitable hydrophobic fillers include those available from Shiraishi Kogyo Kaisha LTD. under the tradename HAKEUNKA and M.P.I. Pharmaceutica GmBH, Hamburg, Germany. Another illustrative hydrophobic filler may be fumed silica such as those available from Wacker Chemie AG, Munich, Germany.

The adhesive also contains a catalyst which catalyzes the reaction of isocyanate moieties with water or an active hydrogen containing compound. The catalyst may be any catalyst known to the skilled artisan for the reaction of isocyanate moieties with water or active hydrogen containing compounds. Preferred catalysts include organotin compounds, metal alkanoates, and tertiary amines. Mixtures of classes of catalysts may be used. A mixture of a tertiary amine and a metal salt is desirable. Tertiary amines, such as dimorpholino diethyl ether (DMDEE), and a metal alkanoate, such as bismuth octoate are a preferred catalyst mixture. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. If the organo tin or metal alkanoate catalyst is present, it typically is present in an amount of about 60 parts per million or greater based on the weight of the adhesive, more preferably 120 parts by million or greater. The total amount of catalysts in the adhesive composition is generally at most about 3%, 2% or 1% to at least about 0.1%, 0.2% or 0.4% by weight of the adhesive composition.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino) alkyl) ether is (di-(2-(3,5-dimethyl-morpholino)ethyl)-ether). Tertiary amines are preferably employed in an amount, based on the weight of the adhesive of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The composition of the invention is also comprised of a plasticizer to modify rheological properties. Such materials should be free of water, inert to isocyanate groups and compatible with the prepolymer. Such material may be added to the reaction mixtures for preparing the prepolymer, or to the mixture for preparing the final adhesive composition, but is preferably added to the reaction mixtures for preparing the prepolymer and the adduct, so that such mixtures may be more easily mixed and handled. Suitable plasticizers and solvents are well known in the art and include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol (Mesamoll, Bayer), toluene-sulfamide, adipic acid esters, castor oil, xylene, 1-methyl-2-pyrrolidinone and toluene. The amount of plasticizer used is that amount sufficient to give the desired rheological properties and disperse the components in the composition of the invention. Preferably, the plasticizer is present in the composition of the invention in an amount of about 0 percent by weight or greater, more preferably about 1 percent by weight or greater and most preferably about 6 percent by weight or greater. The plasticizer is present in an amount of about 15 percent by weight or less and more preferably about 13 percent by weight or less.

The adhesive composition may further comprise a filler which functions as a thixotrope (rheological additive). Such thixotropes are well known to those skilled in the art and include fumed silica and the like. Preferred fumed silicas include organically modified fumed silicas. The thixotrope may be added to the composition in a sufficient amount to give the desired rheological properties. Preferably, the thixotrope is present in an amount of about 0 percent by weight or greater based on the weight of the composition of the invention, preferably about 0.5 percent by weight or greater. Preferably, the optional thixotrope is present in an amount of about 3 percent by weight or less based on the weight of the composition of the invention and more preferably about 2 percent by weight or less.

The composition of the invention may further comprise a polyfunctional isocyanate for the purpose of improving the modulus of the composition in the cured form. "Polyfunctional" as used in the context of the isocyanates refers to isocyanates having a functionality of 3 or greater. The polyisocyanates can be any monomeric, oligomeric or polymeric isocyanate having a nominal functionality of about 3 or greater. More preferably, the polyfunctional isocyanate has a nominal functionality of about 3.2 or greater. Preferably, the polyfunctional isocyanate has a nominal functionality of about 5 or less, even more preferably about 4.5 or less and most preferably about 4.2 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates are present in a sufficient amount to impact the modulus of the cured compositions of the invention. If too much is used, the cure rate of the composition is unacceptably slowed down. If too little is used, the desired modulus levels are not achievable. The polyfunctional isocyanate is preferably present in an amount of about 0.5 percent by weight or greater based on the weight of the adhesive composition, more preferably about 1.0 percent by weight or greater and most preferably about 1.4 percent by weight or greater. The polyfunctional isocyanate is preferably present in an amount of about 8 percent by weight or less, based on the weight of the adhesive composition, more preferably about 5 percent by weight or less and most preferably about 3 percent by weight or less.

The composition of this invention may further comprise stabilizers, which function to protect the adhesive composition from moisture, thereby inhibiting advancement and preventing premature crosslinking of the isocyanates in the adhesive formulation. Stabilizers known to the skilled artisan for moisture curing adhesives may be used preferably herein. Included among such stabilizers are diethylmalonate (DEM), paratoluene sulfonic isocyanates, benzoyl chloride and orthoalkyl formates. Such stabilizers are preferably used in an amount of about 0.1 percent by weight or greater based on the total weight of the adhesive composition, preferably about 0.5 percent by weight or greater and more preferably about 0.8 percent by weight or greater. Such stabilizers are used in an amount of about 5.0 percent by weight or less based on the weight of the adhesive composition, more preferably about 2.0 percent by weight or less and most preferably about 1.4 percent by weight or less.

The composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydrophilic (hydroscopic) materials are pyrrolidinones such as 1 methyl-2-pyrrolidinone, available from under the trademark M-Pyrol. The hydrophilic material is preferably present in an amount of about 0.1 percent by weight or greater and more preferably about 0.3 percent by weight or greater and preferably about 1.0 percent by weight or less and most preferably about 0.6 percent by weight or less.

Other components commonly used in adhesive compositions may be used in the composition of this invention. Such materials are well known to those skilled in the art and may include ultraviolet stabilizers, antioxidants and the like.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments where a substantial amount of polyester based isocyanate functional prepolymer is used, the adhesive compositions may be blended at a temperature above the melting point of the polyester based isocyanate functional prepolymer and below a temperature at which significant side reactions occur. In this embodiment, the temperatures utilized are from about 40° C. to less than about 90° C., and more preferably about 50° C. to about 70° C. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and may be primed prior to application, but the primer is not necessary, see for example, U.S. Pat. Nos. 4,525,511; 3,707,521 and 3,779,794; for typical practices of application.

Generally, the adhesives of the invention are applied at ambient (typically 23° C.) temperature in the presence of atmospheric moisture. Exposure to atmospheric moisture is sufficient to result in curing of the adhesive and generally is essentially the same curing rate so long as there is some amount of atmospheric water, which in essence is at least about 20 to 25% relative humidity (RH). For the purposes of testing the curing behavior, an RH of 50%±5% at 23° C.±2° C. is suitable. Curing can be accelerated by the addition of additional water or by applying heat to the curing adhesive by means of convection heat, microwave heating and the like. Preferably, the adhesive of the invention is formulated to provide a working time of about 6 minutes or greater and more preferably about 10 minutes or greater. Preferably, the working time is about 15 minutes or less and more preferably about 12 minutes or less.

The adhesive composition is preferably used to bond glass or plastic coated with an abrasion resistant coating, to other substrates such as metal or plastics. In a preferred embodiment, the first substrate is a glass, or plastic coated with an abrasion resistant coating, window and the second substrate is a window frame. In another preferred embodiment, the first substrate is a glass, or plastic coated with an abrasion resistant coating, window and the second substrate is a window frame of an automobile. Preferably, the glass window is cleaned prior to being bonded. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter, the new window is cleaned and, if desired, primed. The old adhesive that is located on the window flange can be removed, although it is not necessary and in most cases it is left in place, but may be cut flat with a cutting tool. The window flange may be primed with a paint primer, but is not necessary. The adhesive is applied in a bead to the periphery of the window located such that it will contact the window flange when placed in the vehicle. The window with the adhesive located thereon is then placed into the flange with the adhesive located between the window and the flange. Alternatively, the adhesive may be applied to the window flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure. The composition of the invention is also useful for bonding large mass substrates of more than 20 Kg, up to about 120 Kg, to the substrates. In one class of large mass substrates, the composition of the invention are large windows such as those utilized in mass transportation vehicles.

In certain applications, the polymerizable composition of the invention may be utilized with a primer or an activation wipe. The primer or activation wipe is typically applied to the surface of one or more of the substrates. Any solvent is allowed to volatilize away and then the polymerizable composition is contacted with the substrates. Preferably, the time period from application of the primer or activation wipe to application of the polymerizable composition to the substrate is about 0.5 minutes or greater, more preferably about 1 minute or greater and most preferably about 2 minutes or greater.

Testing and Analytical Procedures:

The press flow viscosity is measured by preconditioning the uncured adhesive to 23° C. and then measuring the amount by weight of material that passes through a nozzle having a diameter of 4 mm and bore length of 5 cm under an applied air pressure of 4 bar. The press flow viscosity is then given in units of g/min.

The weight average molecular weight and the number average molecular weight are determined by Gel Permeation Chromatography (also referred to as GPC or SEC). For the purpose of the invention, both the Mn and the Mw are determined by evaluating only peaks above a molecular weight of 1000 (Mp>1000). The evaluation of the chromatogram for Mn, Mw and PDI is done by the software of the GPC instruments according to the state of the art. Illustratively a GPC available from Dionex with Chromeleon software can be used, with a double PL gel Mixed D separation available from Agilent Technologies, Santa Clara, Calif. GPC grade THF (tetrahydrofuran) as the solvent, allowing separation in the molecular weight range from 1,000-150,000. The column is calibrated with 6 polystyrene calibration standards in the range between 1000 and 150,000. The use of a refractive index detector in combination with a viscosity detector from Viscotek with Omnisec software facilitate both standard evaluation and Intrinsic Viscosity corrected evaluation for Mn, Mw and PDI, the latter giving so called universal molecular weights.

The impact resistance tests are carried out on an impact pendulum tester from Testing Machines Incorporated, New Castle, Del., type 43-01 at an impact speed of 4 m/s. The high speed impact resistance and maximum strength are tested according to the following method. The adhesive is applied between the prongs of the sample preparation holder so that it overflows onto tape. Afterwards coupons (76×25×5 mm) are placed on top of the prongs and the excess adhesive is removed slowly with a spatula to ensure that the bead has a consistent shape (25×13×5 mm). After that the test specimens are stored for the desired cure time (minutes) and environmental conditions. The curing and testing herein are performed at 50%±5% RH at 23° C.±2° C. Then, the impact pendulum was brought up and latched, the test specimen fixed in position and the hammer released and the amount of energy determined by the amount of energy that is absorbed prior to failure of the adhesive.

The shear modulus was determined as follows. Two aluminium plates having dimensions of 10.0×2.5×0.4 cm were placed in lap shear form with an overlap of 10 mm. A primer was applied on the substrate and allowed to stand for at least 15 minutes and for no longer than 3 days. The adhesive was applied to the primed surfaces and the bonded specimens were cured for 7 days at 23°±2° C. and 50%±5% RH. The shear modulus was determined at slippage rates of 10% from the bond height and a pulling speed of 10 mm/min. The calculation of the shear modulus is based re-measured overlapping area and bond height.

The tail formation is determined by applying a smooth bead of approximately 20 cm of length in parallel with the ground on a vertical wall with a nozzle having a right triangular cross-section (profile) that has a 20 mm height and a base of 5 mm. The bead is applied using 7 bar of air pressure. The base of the bead is adhered to the vertical wall with the height of the bead extending orthogonally from the wall at the top of the base and the hypotenuse extending from the tip of the height furthest from the wall to the bottom of the base. After applying the bead, the pressure is stopped and the nozzle is slowly lifted orthogonally away from the wall. The length of the "string" at the end of the bead is measured. The sag resistance is determined by applying a bead of approximately 20 cm in the same manner as described above. After curing for 1 hour at 23° C./50% RH, the amount of sag at the tip of the bead is measured. The rating is 1 to 5. The best rating is 1, essentially no sag, and the worst is 5. Rating 3 is considered as acceptable and correlates to at most a 30° deviation from horizontal. Both sag and tail are measured after the adhesive composition has been freshly made and after being aged in a sealed container for one month at 40° C.

Lap shear strength is determined by a quasi-static lap shear test at 10 mm/min according to ASTM D1002.

Illustrative Embodiments of the Invention

The following examples are provided to illustrate the invention, but are not intended to limit the scope thereof. All parts and percentages are by weight unless otherwise indicated.

TABLE 1

| Ingredient | Tradename | Vendor | Specifications |
|---|---|---|---|
| Polyoxypropylene Diol 1 | DESMOPHEN 2061BD | Bayer | hydroxyl number 56. |
| Polyoxypropylene Triol 1 | ACCLAIM 6300 | Bayer | hydroxyl number 28; |
| Polyoxypropylene Diol 2 | VORANOL 2000L | Dow | hydroxyl number ~55.5. |
| Polyoxypropylene Triol 2 | VORANOL 4610 | Bayer | hydroxyl number ~35. |
| Polyoxypropylene Triol 3 SAN grafted | SPECFLEX NC 700 | Dow | hydroxyl number ~21 |
| Polyester diol 1 | DYNACOLL 7381 | Degussa | hydroxyl number ~30; |
| Diphenylmethane 4,4' diisocyanate | ISONATE M 125 | Dow | NCO number ~33% |
| Polyfunctional polyisocyanate | DESMODUR N3300 | Bayer | Functionality 3 |
| Carbon Black | PRINTEX 30 | Degussa | pH ~10, BET ~80 m$^2$/g |
| Clay | POLESTAR 200R | Imerys | average particle size ~. 2 µm (90% < 10 µm), BET surface ~8.5 m$^2$/g, pH ~6.0-6.5. |

TABLE 1-continued

| Ingredient | Tradename | Vendor | Specifications |
|---|---|---|---|
| Plasticizer | VESTINOL 9 | Oxeno Olefin Chemie | |
| Hydrophobic filler calcium carbonate (M202S) | M202S | Pharma MPI | pH ~8.5, 17-28 m$^2$/g. |
| Hydrophobic filler calcium carbonate | Hakuenka CCR-S | Shiraishi | 17 m$^2$/g, pH value of 9.3 |
| Hydrophobic filler (fumed silica) | HDK H20 | Wacker | primary particle size ~10-30 nm, agglomerate particle size ~10-100 μm, pH ~3.8-4.8. |
| Silanated adhesion promoter | Silquest 187 | Momentive | gamma-glycidoxypropyl-trimethoxysilane |
| Stabilizer(DEM) | Diethylmalonate (99%) | Evonik | Diethylmalonate |
| Catalyst (DMDEE) | Jeffcat DMDEE | Huntsman | dimorpholino diethyl ether |

Prepolymer Preparation

Prepolymer 1 is prepared by mixing 60.000 g of polyoxypropylene diol 1 with 15.000 g of polyoxypropylene triol 1. 10.983 g of plasticizer and 13.000 g of diphenylmethane 4,4' diisocyanate are added. Then 0.001 g of orthophosphoric acid in 0.009 g of methyl ethyl ketone and 1.000 g of diethylemalonate are added. The reaction mixture is heated to 50° C. in a reactor and 0.007 g of stannous octoate are added. The reaction is carried out for 1 hour at 50° C. Prepolymer 1 is essentially a linear prepolymer (i.e., at most trace amounts of branched if any) not including of course other ingredients that do not form the prepolymer such as plasticizer.

Prepolymer 2 is prepared by mixing 22.799 g of polyoxypropylene diol 2 with 33.476 g of polyoxypropylene triol 2. 34.120 g of plasticizer and 9.597 g of diphenylmethane 4,4' diisocyanate are added. Then 0.001 g or orthophosphoric acid in 0.009 g of methyl ethyl ketone and 1.000 g of diethylmalonate are added. The reaction mixture is heated to 50° C. in a reactor and 0.007 g of stannous octoate are added. The reaction is carried out for 1 hour at 50° C. Prepolymer 2 had about 60% by weight of linear prepolymer and 40% of branched prepolymer by weight of the total amount of weight of prepolymer 2 not including any ingredients that do not react to form the prepolymer such as plasticizer.

Prepolymer 3 is a polyester prepolymer. It is prepared by adding 71.70 g of polyester diol 1, 17.50 g of plasticizer and 10.80 g of diphenylmethane 4,4' diisocyanate to a reactor. The reaction mixture is heated to 50° C. in a reactor and 0.007 g of stannous octoate are added. The reaction is carried out for 1 hour at 50° C.

Adhesive Preparation

The Examples and Comparative Examples Adhesives were prepared as follows using the formulations given in Table 2. The adhesive compositions were prepared in ~3500 g batch sizes in a Molteni mixer. Prepolymers 1 and 2 and Desmodur N3300 were added to the mixer and stirred for 1 hour under a vacuum of 6 to 10 bars at a stirrer rpm of 50. The fillers were then added and mixing was continued until the fillers were wetted well. Any small amount of filler residue on the e mixer walls and the stirrer were manually scraped and mixing was continued for another 30 min to ensure a uniform mixture. The mixer was heated to 75° C. and stirring was continued for a further 15 min Prepolymer 3, if added, was pre-heated to 90° C., and was added to the warmed mixture with stirring continued for an additional 15 min. The remaining ingredients were finally added and mixing was continued for a final 15 min under vacuum (6 to 10 bar). The total weight of the ingredients listed for all examples is 100 parts by weight.

TABLE 2

Adhesive Formulations

| Ex. | Silquest 187 | P2 | P1 | P3 | Desmodur N3300 | Printex 30 | Clay | CCR-S | MPI-202S | HDK H 20 | Plasticizer (added) | Plasticizer (tota) | DEM | DMDEE |
|---|---|---|---|---|---|---|---|---|---|---|---|---|---|---|
| 1 | 0.4 | 22.0 | 34.0 | 1.0 | 1.7 | 16.0 | 24.1 | 0.0 | 0.0 | 0.0 | 0.0 | 10.2 | 0.4 | 0.4 |
| 2 | 0.4 | 20.8 | 34.4 | 1.0 | 2.3 | 16.0 | 24.1 | 0.0 | 0.0 | 0.0 | 0.0 | 10.2 | 0.4 | 0.6 |
| 3 | 0.4 | 22.0 | 34.0 | 1.0 | 1.7 | 16.0 | 14.1 | 0.0 | 10.0 | 0.0 | 0.0 | 10.0 | 0.4 | 0.4 |
| Comp 1 | 0.4 | 0.0 | 49.9 | 1.5 | 2.7 | 15.5 | 13.0 | 5.0 | 0.0 | 0.0 | 11.3 | 16.2 | 0.4 | 0.4 |
| Comp 2 | 0.4 | 0.0 | 49.9 | 1.5 | 2.7 | 15.5 | 13.0 | 0.0 | 5.0 | 0.0 | 11.3 | 16.2 | 0.4 | 0.4 |
| Comp 3 | 0.4 | 53.5 | 7.1 | 1.5 | 2.2 | 15.5 | 12.5 | 4.5 | 2.0 | 0.0 | 16.8 | 0.0 | 0.4 | 0.4 |
| Comp 4 | 0.4 | 29.5 | 24.6 | 0.0 | 1.8 | 16.5 | 26.5 | 0.0 | 0.0 | 0.0 | 0.0 | 11.3 | 0.4 | 0.4 |
| Comp 5 | 0.0 | 22.2 | 34.2 | 1.0 | 1.5 | 16.0 | 24.3 | 0.0 | 0.0 | 0.0 | 0.0 | 10.1 | 0.4 | 0.4 |
| Comp 6 | 0.4 | 0.0 | 51.0 | 1.5 | 2.2 | 15.5 | 5.0 | 0.0 | 13.0 | 0.0 | 0.0 | 17.2 | 0.4 | 0.4 |

P1, P2 and P3 = Prepolymers 1, 2 and 3

TABLE 3

Adhesive Properties

| Ex. | Press flow viscosity [g/min] | Press flow viscosity, 1 M 40° C. [g/min] | Impact 15 min [J] | Impact 30 min [J] | Impact 60 min [J] | Impact 90 min [J] | Impact 120 min [J] | Resistivity [Ωcm] | G-modulus [MPa] | Sag Fresh | Sag 1 Month @ 40° C. | Tail Fresh (mm) | Tail 1 Month @ 40° C. (mm) |
|---|---|---|---|---|---|---|---|---|---|---|---|---|---|
| 1 | 13 | 8 | 2.4 | 2.9 | 3.9 | 4.4 | 5.1 | $2.3 \cdot 10^{10}$ | 2.50 | 1 | 3-4 | 27 | 45 |
| 2 | 10 | 6 | 2.8 | 3.4 | 4.1 | 4.5 | 4.5 | $4.0 \cdot 10^{11}$ | 2.70 | 1 | 1 | 29 | 45 |
| 3 | 8 | 5 | 2.8 | 3.4 | 4.0 | 4.8 | 5.2 | $1.8 \cdot 10^{11}$ | 2.90 | 1 | 2 | 27 | 45 |
| Comp. 1 | 18 | 11 | 3.2 | 3.3 | 4.4 | 4.9 | 5.6 | $1.7 \cdot 10^{11}$ | 1.90 | 1 | 3-4 | 37 | 70 |
| Comp. 2 | 16 | 11 | 2.9 | 3.3 | 4.0 | 4.8 | 5.3 | $2.0 \cdot 10^{11}$ | 2.00 | 1 | 4 | 30 | 65 |

TABLE 3-continued

Adhesive Properties

| Ex. | Press flow viscosity [g/min] | Press flow viscosity, 1 M 40° C. [g/min] | Impact 15 min [J] | Impact 30 min [J] | Impact 60 min [J] | Impact 90 min [J] | Impact 120 min [J] | Resistivity [Ωcm] | G-modulus [MPa] | Sag Fresh | Sag 1 Month @ 40° C. | Tail Fresh (mm) | Tail 1 Month @ 40° C. (mm) |
|---|---|---|---|---|---|---|---|---|---|---|---|---|---|
| Comp. 3 | 10 | 5 | 2.0 | 2.3 | 3.4 | 4.8 | 5.5 | $4.5\ 10^{10}$ | 2.20 | 1 | 1 | 18 | 20 |
| Comp. 4 | 18 | 12 | 1.7 | 1.7 | 2.6 | 3.9 | 4.0 | $5.8\ 10^{10}$ | 2.50 | 1 | 5 | 25 | 65 |
| Comp. 5 | 13 | 10 | 2.1 | 2.4 | 3.3 | 4.3 | 4.9 | $1.5\ 10^{11}$ | 2.80 | 1 | 1 | 23 | 32 |
| Comp. 6 | 14 | 5 | 2.3 | 3.2 | 4.5 | 5.2 | 5.9 | $2.8\ 10^{11}$ | 2.10 | 1 | 5 | 32 | 60 |

1 M 40° C. = Composition aged in sealed container for one month at 40° C. prior to testing.

From Tables 2 and 3, the adhesive of Comparative example 5, which has essentially the same ratio of linear to branched isocyanate functional polyether prepolymer as Examples 1 to 3, but lacks the silanated adhesion promoter (Silquest 187), fails to adhere adequately in the absence of a primer and also does not achieve an adequate impact strength in 15 minutes as displayed by Examples 1 to 3 and in particular Example 1. Consequently, it shows that not merely must the ratio linear to branched prepolymers be correct, but that a silanated groups must also be present in the adhesive composition.

Likewise, the adhesive of Comparative Example 4, which lacks prepolymer 3 (isocyanate functional polyester prepolymer), but has essentially the same ratio of linear to branched isocyanate functional polyether as Examples 1 to 3, fails to achieve the impact energy and has inadequate aging properties as indicated by the aged sag and tail results.

The adhesives of Comparative Examples 1, 2, and 6 show that when the adhesive fails to have an adequate amount of branched isocyanate functional polyether prepolymer, even with varying amounts of filler in differing ratios the adhesive is not able to achieve the necessary G modulus or the impact energy after 15 minutes. Each of these also have inadequate aging characteristics as shown by substantial increase in tail and sag after aging.

The adhesive of Comparative Example 3 shows that when the adhesive has too much branched isocyanate functional polyether prepolymer, the adhesive fails to achieve the G modulus or impact energy after 15 minutes. The adhesive of the Comparative Example does display good aging characteristics, but does not allow for fast drive away times as shown by the Examples of the invention.

The invention claimed is:

1. An adhesive composition comprising:
a) a reactive silicon adhesion promoter which is a silane compound containing epoxy groups;
b) isocyanate functional polyether prepolymers, each having a polydispersity index of at most 2.5, as measured by GPC, including:
 b1) a first isocyanate functional polyether prepolymer prepared by reacting one or more polyols and a difunctional isocyanate, wherein the one or more polyols having a backbone of one or more alkylene oxides, wherein the one or more polyols includes a diol and optionally one or more polyols having 3 or more isocyanate-reactive groups, wherein the amount of the polyols having 3 or more isocyanate-reactive functional groups is sufficiently low so that the first isocyanate function polyether polymer is linear and contains no or trace amounts of branched prepolymer; and
 b2) a second isocyanate functional polyether prepolymer prepared from a polyol having a backbone of one or more alkylene oxides, a polyisocyanate or both having a functionality which is greater than 2, wherein the functionality of the polyol or polyisocyanate is sufficiently high so that the second isocyanate functional polyether prepolymer includes branched isocyanate functional polyether prepolymer, wherein the first and second isocyanate functional polyether prepolymers are present in the composition at a weight ratio of 1/3 to 5/1, wherein the total amount of the first and second prepolymer is 10 weight percent to 60 weight percent of the composition;
c) an isocyanate functional polyester prepolymer which is solid at 23° C. present in an amount of 0.1 to 5 percent by weight of the composition;
d) a plasticizer;
e) two or more fillers including a carbon black in an amount from 10% to about 17% by weight of the composition and one or more additional fillers, wherein the total amount of filler is from about 27% to 50% by weight of the composition;
f) a catalyst for the reaction of isocyanate moieties with isocyanate reactive groups; and
g) at least 1.4 weight percent of a polyfunctional isocyanate having a functionality of 3 or more;
wherein the total amount of the plasticizer in the adhesive composition is about 5% to 20% by weight.

2. The adhesive composition of claim 1 wherein the one or more additional fillers comprises a hydrophilic filler including a clay.

3. The adhesive composition of claim 2 wherein the one or more additional fillers includes a hydrophobic calcium carbonate, present in an amount from 5 to 40 weight percent, based on the total weight of the one or more additional fillers.

4. The adhesive composition of claim 1 wherein the weight ratio of the first isocyanate functional polyether prepolymer to the second isocyanate functional polyether prepolymer is 10/13 to 3/1.

5. The adhesive composition of claim 1 wherein the reactive silicon adhesion promoter is beta-(3,4-epoxycyclohexyl)ethyltrimethoxysilane, gamma-glycidoxypropyltrimethoxysilane or combination thereof.

6. The adhesive composition of claim 1 wherein the amount of the isocyanate functional polyester is 0.2 to 2% by weight of the composition.

7. The adhesive composition of claim 1, wherein the plasticizer is present in an amount of 8% to 15% by weight of the composition.

8. The adhesive composition of claim 1, wherein the polyfunctional isocyanate is present in an amount 1.4 to 5 weight percent.

9. A method of bonding two or more substrates together comprising,
(a) disposing the adhesive of claim 1 on at least a portion of a surface of at least one of the substrates, wherein the substrates are not treated with a primer,
(b) contacting the adhesive composition disposed on the surface of said substrate with another substrate such that the adhesive composition is disposed between the substrates, and
(c) curing the adhesive under ambient conditions.

10. The method of claim 9 wherein the adhesive after disposing has a sag that is at most 1 mm and tail that is at most 30 mm.

11. A method of bonding two or more substrates together comprising,
(a) disposing the adhesive of claim 1 on at least a portion of a surface of at least one of the substrates, wherein the substrates are not treated with a primer,
(b) contacting the adhesive composition disposed on the surface of said substrate with another substrate such that the adhesive composition is disposed between the substrates, and
(c) curing the adhesive under ambient conditions.

12. The adhesive composition of claim 4, wherein the polydispersity index of each of the first and second isocyanate functional polyether prepolymers is about 2 to 2.5, and the total amount of the first and second isocyanate functional polyether prepolymers is at least 50% by weight, based on the total weight of the adhesive composition.

13. The method of claim 9, wherein the polydispersity index of each of the first and second isocyanate functional polyether prepolymers is about 2 to 2.5, and the total amount of the first and second isocyanate functional polyether prepolymers is at least 50% by weight, based on the total weight of the adhesive composition.

14. An adhesive composition comprising:
a) 0.001 weight percent to 1 weight percent of a reactive silicon adhesion promoter which is a silane compound containing epoxy groups;
b) 10 weight percent to 60 weight percent of isocyanate functional polyether prepolymers, each having a polydispersity index of at most 2.5, as measured by GPC, including:
b1) a first isocyanate functional polyether prepolymer prepared by reacting one or more polyols and a difunctional isocyanate, wherein the one or more polyols having a backbone consisting of one or more alkylene oxides, wherein the one or more polyols includes a diol and optionally one or more polyols having 3 or more isocyanate-reactive groups, wherein the amount of the polyols having 3 or more isocyanate-reactive functional groups is sufficiently low so that the first isocyanate function polyether polymer is linear and contains no or trace amounts of branched prepolymer; and
b2) a second isocyanate functional polyether prepolymer prepared from a polyol having a backbone consisting of one or more alkylene oxides, a polyisocyanate or both having a functionality which is greater than 2, wherein the functionality of the polyol or polyisocyanate is sufficiently high so that the second isocyanate functional polyether prepolymer includes branched isocyanate functional polyether prepolymer, wherein the first and second isocyanate functional polyether prepolymers are present in the composition at a weight ratio of 1/3 to 5/1, wherein the total amount of the first and second prepolymer is 10 weight percent to 60 weight percent of the composition;
c) an isocyanate functional polyester prepolymer which is solid at 23° C. present in an amount of 0.1 to 5 percent by weight of the composition;
d) a plasticizer present in an amount from 5 to 20 percent by weight of the composition;
e) two or more fillers including a carbon black in an amount from 10% to about 17% by weight of the composition and one or more additional fillers, wherein the total amount of filler is from about 27% to 50% by weight of the composition; and
f) a catalyst for the reaction of isocyanate moieties with isocyanate reactive groups present in an amount of 0.1 to 3 percent by weight of the composition.

15. The composition of claim 14, wherein the composition consists of the a) reactive silicon adhesion promoter; the b) isocyanate functional polyether prepolymers, each having a polydispersity index of at most 2.5, as measured by GPC; the c) isocyanate functional polyester prepolymer; the d) plasticizer; the e) two or more fillers; the f) catalyst; optionally a polyfunctional isocyanate; optionally one or more stabilizers; optionally one or more additional catalysts; and optionally one or more thixotropes or other rheology modifiers.

16. The composition of claim 1, wherein the composition consists of the a) reactive silicon adhesion promoter; the b) isocyanate functional polyether prepolymers, each having a polydispersity index of at most 2.5, as measured by GPC; the c) isocyanate functional polyester prepolymer; the d) plasticizer; the e) two or more fillers; the f) catalyst; the g) polyfunctional isocyanate; optionally one or more stabilizers; optionally one or more additional catalysts; and optionally one or more thixotropes or other rheology modifiers.

* * * * *